US012706019B2

(12) United States Patent
Duan et al.

(10) Patent No.: US 12,706,019 B2
(45) Date of Patent: Aug. 11, 2026

(54) DISPLAY SYSTEM AND DISPLAY DEVICE

(71) Applicant: BOE Technology Group Co., Ltd., Beijing (CN)

(72) Inventors: Xin Duan, Beijing (CN); Wei Sun, Beijing (CN); Shuhuan Yu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 248 days.

(21) Appl. No.: 18/560,397

(22) PCT Filed: May 14, 2021

(86) PCT No.: PCT/CN2021/093830
§ 371 (c)(1),
(2) Date: Nov. 12, 2023

(87) PCT Pub. No.: WO2022/236808
PCT Pub. Date: Nov. 17, 2022

(65) Prior Publication Data
US 2024/0257708 A1 Aug. 1, 2024

(51) Int. Cl.
*G09G 3/20* (2006.01)
*G09G 3/00* (2006.01)

(52) U.S. Cl.
CPC ........... *G09G 3/2096* (2013.01); *G09G 3/001* (2013.01); *G09G 2310/04* (2013.01); *G09G 2354/00* (2013.01); *G09G 2370/10* (2013.01)

(58) Field of Classification Search
CPC .................... G09G 2340/0407; G06F 12/4027
See application file for complete search history.

(56) References Cited

U.S. PATENT DOCUMENTS 10,871,825 B1 * 12/2020 Sztuk ...................... G06F 3/011
2011/0273369 A1 11/2011 Imai et al.
2019/0180672 A1 * 6/2019 Knez ...................... G09G 5/397
2021/0056719 A1 2/2021 Li et al.
2021/0166341 A1 * 6/2021 Bastani ................... G06T 11/00
(Continued)

FOREIGN PATENT DOCUMENTS

CN 102208171 A 10/2011
CN 103024583 A 4/2013
(Continued)

OTHER PUBLICATIONS

International Search Report for PCT/CN2021/093830 Mailed Feb. 10, 2022.

*Primary Examiner* — William Boddie
*Assistant Examiner* — Alecia D English

(57) ABSTRACT

A display system includes: a multi-scenario trigger circuit (10), which is configured to determine, according to a usage scenario triggered by a display device, a display partition used for high-definition display among a plurality of display partitions; a display content generation circuit (20), which is configured to render each frame of partition image of the display partition used for high-definition display, and fuse a partition identifier of the corresponding display partition into each frame of rendered partition image, so as to form a frame image data stream; a display drive control circuit (30), which is configured to generate a control instruction stream for driving the display partition used for high-definition display.

14 Claims, 9 Drawing Sheets

(56) References Cited

U.S. PATENT DOCUMENTS

| | | | | |
|---|---|---|---|---|
| 2021/0274200 | A1* | 9/2021 | Cismas .................. | H04N 19/17 |
| 2024/0196065 | A1* | 6/2024 | Hamada ............... | G06V 10/761 |

FOREIGN PATENT DOCUMENTS

| | | | |
|---|---|---|---|
| CN | 103220478 | A | 7/2013 |
| CN | 103974115 | A | 8/2014 |
| CN | 107317960 | A | 11/2017 |
| CN | 110460831 | A | 11/2019 |
| CN | 111047676 | A | 4/2020 |
| CN | 111190486 | A | 5/2020 |

* cited by examiner

DISPLAY SYSTEM AND DISPLAY DEVICE

CROSS-REFERENCE TO RELATED APPLICATION

This application is a national stage application of PCT Application No. PCT/CN2021/093830, which is filed on May 14, 2021 and entitled "Display Substrate and Display Device", the content of which should be regarded as being incorporated herein by reference.

TECHNICAL FIELD

The disclosure relates to the display field, in particular to a display system and a display device.

BACKGROUND

In the prior art, the display picture of the display device is usually rendered, transmitted and displayed using an entire frame image as the base unit.

With the development of high-definition and high-frequency display, the resolution of frame images processed by display devices is increasing, and the number of frame images that need to be processed per unit time is also increasing, which requires display devices to have a large amount of software and hardware resources for rendering, transmitting, and displaying frame images.

SUMMARY

The disclosure provides a display system and a display device for solving the technical problems in the prior art.

In a first aspect, in order to solve the above technical problems, a display system provided by an embodiment of the present disclosure is applied to a display device comprising a plurality of display partitions. The technical scheme of the display system is as follows:

a multi-scenario trigger circuit, configured to determine, according to a usage scenario in which the display device is triggered, a display partition for high-definition display among the plurality of display partitions;

a display content generation circuit, configured to render each frame of a partition image of the display partition for high-definition display, and fuse a partition identifier of the display partition for high-definition display into each frame of the rendered partition image to form a corresponding frame image data stream;

a display drive control circuit, configured to generate a control instruction stream to drive the display partition for high-definition display so that the display partition for high-definition display displays each frame of an image in the frame image data stream; wherein, each control instruction in the intelligent control instruction stream carries a same time identifier as the corresponding rendered partition image;

a drive circuit, configured, for the frame image data stream and the control instruction stream which have a same partition identifier, to form control instructions which have a same time identifier, and rendered partition images into a group, and in chronological order, drive, group by group and according to a control instruction in a current group, the corresponding display partition to display the rendered partition image in the current group.

In a possible embodiment, the multi-scenario trigger circuit is further configured to:

when the display device is simultaneously triggered with a plurality of usage scenarios, determine, according to the plurality of usage scenarios, a display partition corresponding to each usage scenario.

In a possible embodiment, the display content generation circuit is further configured to:

when the display device is simultaneously triggered with a plurality of usage scenarios, render each frame of partition image of the display partition for high-definition display corresponding to the usage scenarios with high priority sequentially according to a priority level of the plurality of usage scenarios, and fuse a corresponding partition identifier into each corresponding frame of the rendered partition image to form a frame image data stream corresponding to each display partition for high-definition display.

In a possible embodiment, the display drive control circuit is further configured to:

generate corresponding drive state control instructions and timing control instructions according to the partition identifier of the display partition for high-definition display; the drive state control instruction is configured to perform function control on the drive circuit to control the display partition for high-definition display to perform high-definition display; the timing control instructions are configured to generate timing control signals required for image display for the display partition for high-definition display.

In a possible embodiment, the drive circuit comprises:

a source drive chip, which is configured to gate, according to a control instruction in the current group, a data channel corresponding to the display partition for high-definition display, and convert the rendered partition image in the current group into a corresponding data drive signal, which is provided to the display partition for high-definition display through the data channel to drive a corresponding column of pixels;

a gate drive circuit, which is configured to provide, according to a control instruction in the current group, a row scan signal to a plurality of pixel rows where the display partition for high-definition display is located, so as to refresh the data drive signal to the display partition for high-definition display.

In a possible embodiment, the source drive chip comprises:

a plurality of data partitions, each of which corresponds to a data transmission channel for a column of display partitions.

In a possible embodiment, the source drive chip is further configured to arrange a plurality of partition images corresponding to the display partition for high-definition display in an interval area between entire frame images.

In a possible embodiment, in the gate drive circuit, a plurality of display partitions corresponding to a same row share a same frame start signal.

In a possible embodiment, the drive circuit further comprises at least one TCON chip.

In a possible embodiment, when the partition image is a three-dimensional stereogram, the drive circuit comprises a plurality of the TCON chips, and each display partition for high-definition display corresponds to one TCON chip and one data channel.

In a possible embodiment, in the display device, the data channels of display partitions other than the display partition for high-definition display are in an off state.

In a possible embodiment, the drive circuit is further configured to:

drive the display partition for high-definition display with idle resources; wherein, the idle resources are drive resources corresponding to display partitions other than the display partition for high-definition display.

In a possible embodiment, all chips in the display device are connected in parallel with a same signal bus which is used to transmit data or instructions;

different chips time-multiplex the signal bus.

In a possible embodiment, the chips connected with the signal bus cache received control instructions simultaneously upon receipt of a same enable signal.

In a possible embodiment, a data format for data packets transmitted in the signal bus comprises:

a feature specification portion configured to indicate a type of instruction;

an identifier recognition portion configured as a chip and a chip partition corresponding to the data packet;

a register portion configured to store control instructions or data.

In a second aspect, an embodiment of the present disclosure provides a display device comprising a display system as described in the first aspect.

DETAILED DESCRIPTION

Embodiments of the present disclosure provides a display system and a display device to solve the technical problems existing in the prior art.

In order to better understand the above-described technical schemes, the following detailed description of the technical schemes of the present disclosure will be made with reference to the drawings and specific embodiments. It should be understood that embodiments in of the present disclosure and specific features in the embodiments are detailed description of the technical schemes of the present disclosure, rather than limitation on the technical schemes of the present disclosure, and the embodiments in the present disclosure and technical features in the embodiments, may be combined with each other if there is no conflict.

Figure 1:
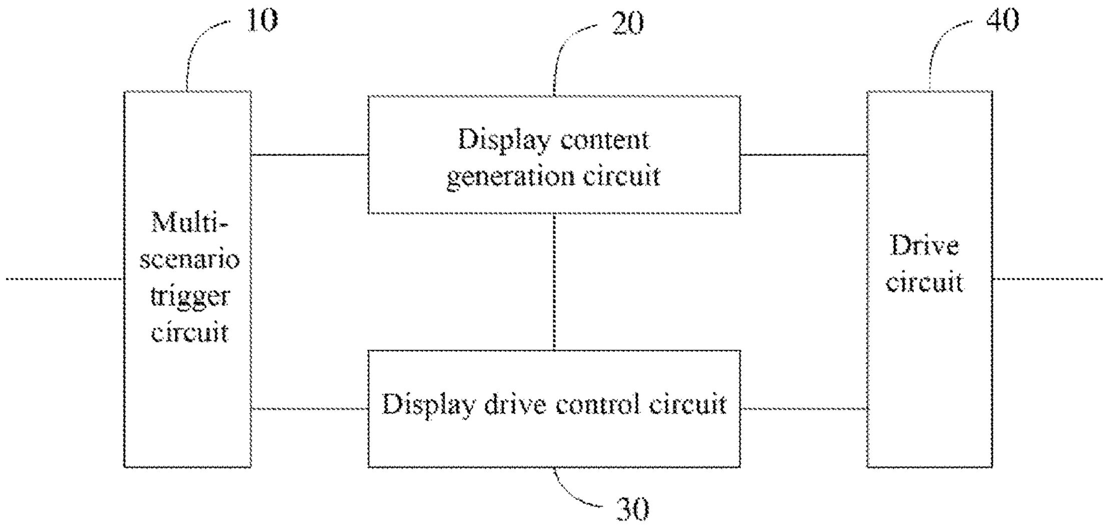
FIG. 1 is a schematic diagram I of a structure of a display system according to an embodiment of the present disclosure.
Figure 2:
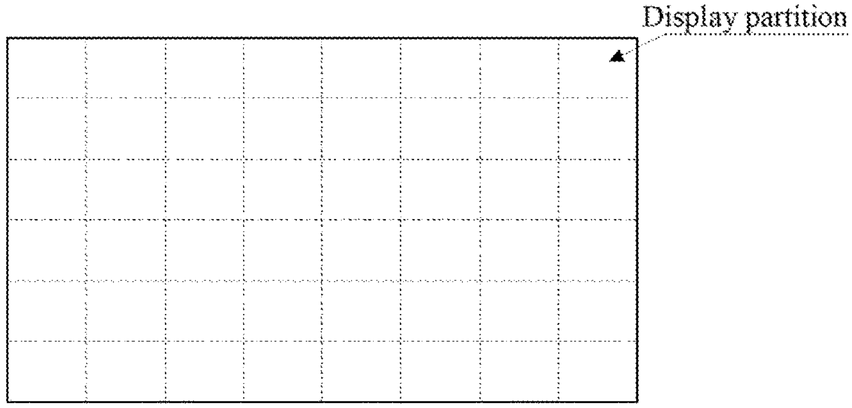
FIG. 2 is a schematic diagram of a structure of a plurality of display partitions in a display device according to an embodiment of the present disclosure.

Referring to FIG. 1 and FIG. 2, FIG. 1 is a schematic diagram I of a structure of a display system according to an embodiment of the present disclosure, and FIG. 2 is a schematic diagram of a structure of a plurality of display partitions in a display device according to an embodiment of the present disclosure. Embodiments of the present disclosure provide a display system applied to a display device including a plurality of display partitions. The processing procedure of this display system is as follows.

A multi-scenario trigger circuit 10 is configured to determine, according to a usage scenario in which the display device is triggered, a display partition for high-definition display among the plurality of display partitions.

The display device is high-definition/high-frequency display device, such as a 4K television.

As shown in FIG. 2, the display area of the display device is divided into 48 display partitions, i.e., the display device includes 48 display partitions.

It should be understood that the display area of the display device corresponds to a complete screen, not a spliced screen.

The usage scenarios of the display device include but are not limited to human eye gaze coordinates, display content update, touch coordinates, mouse coordinates, external ambient light/temperature, etc.

Figure 3:
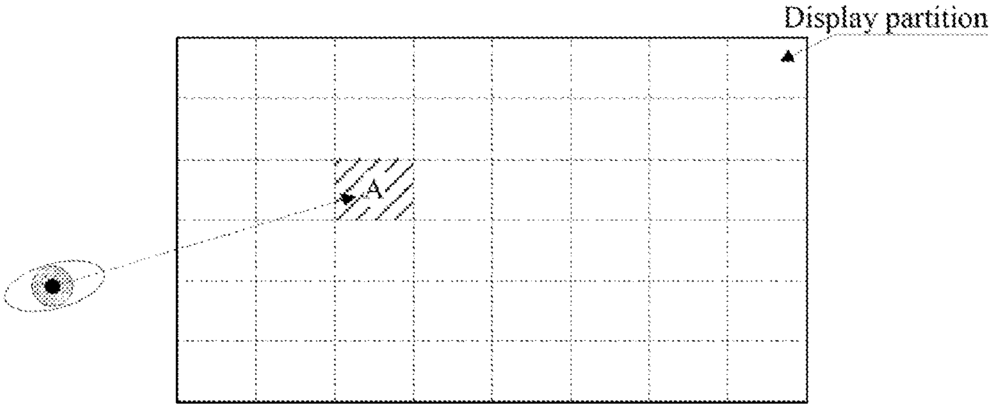
FIG. 3 is a schematic diagram of triggering human eye gaze coordinate detection according to an embodiment of the present disclosure.

Referring to FIG. 3, FIG. 3 is a schematic diagram of triggering human eye gaze coordinate detection according to an embodiment of the present disclosure.

When the display device detects that the user is gazing at its display area, the triggered usage scenario is human eye gaze coordinate detection. In the usage scenario of human eye gaze coordinate detection, the human eye gaze area (as shown by the slash area in FIG. 3) is analyzed by the coordinate of human eye gaze point, and then the display partition corresponding to the human eye gaze area is determined as the display partition A, and the display partition for high-definition display is determined as the display partition A among 48 display partitions included in the display device.

Figure 4:
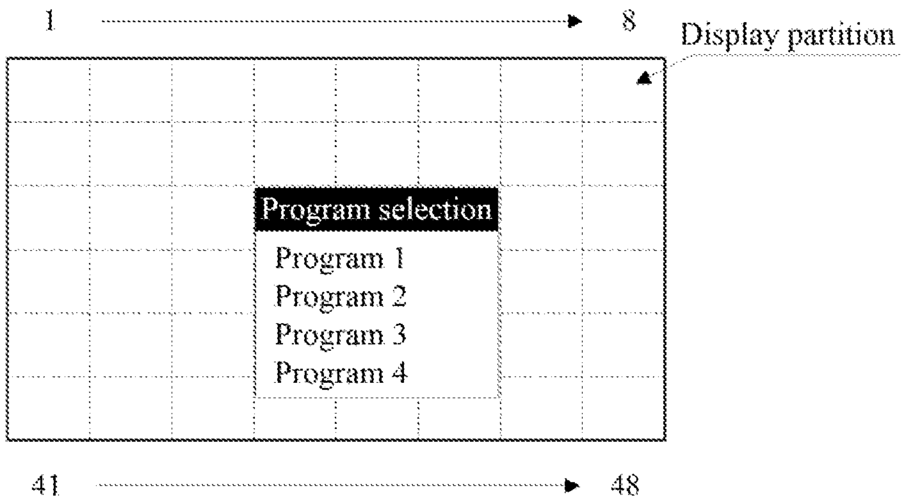
FIG. 4 is a schematic diagram of triggering display content update according to an embodiment of the present disclosure.

Referring to FIG. 4, FIG. 4 is a schematic diagram of triggering display content update according to an embodiment of the present disclosure.

It is assumed that the display device is a television set, and the display area of the television set includes 48 display partitions. As shown in FIG. 4, the numbering of the display partitions in each row increases sequentially from left to right sequentially, for example, the numbering of the display partitions from the upper left end to the upper right end increases sequentially (1→8), and the numbering of the display partitions from the lower left end to the lower right end increases sequentially (41→48).

After the user operates the program button in the remote controller of the television set, a "program selection" menu (showing programs 1 to 4) pops up, and the triggered usage scenario is the display content scenario update. In this usage scenario, it is determined that the display partitions corresponding to the "program selection" menu include display partitions 20-22, 28-30, 36-38, 44-46, and then the display partitions for high-definition display are determined to be display partitions 20-22, 28-30, 36-38, 44-46, with a total of 12 display partitions, among the 48 display partitions included in the television set.

In a possible embodiment, the multi-scenario trigger circuit is further configured to, when the display device is simultaneously triggered with a plurality of usage scenarios, determine, according to the plurality of usage scenarios, a display partition corresponding to each of the usage scenarios.

For example, still taking FIG. 4 as an example, the usage scenarios which the television set is currently and simultaneously triggered with include eye gaze coordinate detection and display content update, and it is determined that the display partitions corresponding to the usage scenario of eye gaze coordinate detection is display partition 18, and it is determined that the display partitions corresponding to the usage scenario of display content update are display partition 20-22, 28-30, 36-38 and 44-46. That is to say, at this time, the multi-scenario trigger circuit 10 determines that, among the 48 partitions of the television set, the display partitions for high-definition display are display partitions 18, 20-22, 28-30, 36-38, and 44-46, with a total of 13 display partitions.

If, in the above example, it is determined that the display partition corresponding to the usage scenario of the eye gaze coordinate detection is display partition 28, the multi-scenario trigger circuit 10 determines that among the 48 partitions of the television set, the display partitions for high-definition display are display partitions 20 to 22, 28 to 30, 36 to 38, and 44 to 46, with a total of 12 display partitions. That is, when it is determined that the display partitions corresponding to two usage scenarios have the same display partition, the display partitions for high-definition display determined by the multi-scenario trigger circuit 10 are the display partitions after duplication removal.

In addition, a priority can be set for each usage scenario in the display device. When a plurality of usage scenarios are triggered at the same time, a display partition corresponding to a usage scenario with a high priority can be determined according to the priority of the usage scenarios. The priority of the usage scenario is transmitted to the display content generation circuit 20 together with the partition identifier of the corresponding display partition. If the same display partition corresponds to a plurality of usage scenarios, the priority corresponding to the usage scenario with high priority is taken as the priority corresponding to the display partition.

After the multi-scenario trigger circuit 10 determines a display partition for high-definition display, it will transmit the partition identifier corresponding to the display partition to the display content generation circuit 20 to generate the display partition content, and also transmit the partition identifier corresponding to the display partition to the display drive control circuit 30 to generate the drive instruction.

The display content generation circuit 20 is configured to render each frame of partition image of the display partition for high-definition display, and to fuse the partition identifier of the display partition for high-definition display into each frame of rendered partition image to form a corresponding frame image data stream.

For example, still taking the example of FIG. 3 as an example, the display content generation circuit 20 determines to render each frame of partition image corresponding to the display partition A from the partition identifier provided by the multi-scenario trigger circuit 10, and fuses the partition identifier of the display partition A into each frame of corresponding rendered partition image to form a frame image data stream corresponding to the display partition A. Apparently, the display content generation circuit 20 only needs to render 1/48 of the original image corresponding to the display area and the corresponding amount of data processing can be effectively reduced.

For another example, taking FIG. 4 as an example, the display content generation circuit 20 determines, from the partition identifiers provided by the multi-scenario trigger circuit 10, to render each frame of partition image corresponding to the 12 display partitions 20-22, 28-30, 36-38, and 44-46, respectively, and fuses the partition identifier of each above display partition into each corresponding frame of rendered partition image respectively to form a frame image data stream corresponding to each above display partition. Apparently, the display content generation circuit 20 only needs to render 12/48=1/4 of the original image corresponding to the display area and the corresponding amount of data processing can be effectively reduced.

In a possible embodiment, the display content generation circuit 20 is further configured to, when the display device is simultaneously triggered with a plurality of usage scenarios, render each frame of partition image of the display partition for high-definition display corresponding to the usage scenario with high priority sequentially according to the priority level of the plurality of usage scenarios, and to fuse the corresponding partition identifier into the rendered partition image corresponding to each frame to form a frame image data stream corresponding to each display partition for high-definition display.

For example, still taking FIG. 4 as an example, the display content generation circuit 20 determines that the display partition for high-definition display includes 13 display partitions including display partition 18, display partitions 20-22, display partitions 28-30, display partitions 36-38, and display partitions 44-46 from the partition identifiers provided by the multi-scenario trigger circuit 10, and renders each frame of partition image corresponding to the display partition corresponding to the high priority sequentially according to the priority of the usage scenario corresponding to each display partition provided by the multi-scenario trigger circuit 10, and fuses the partition identifier of the corresponding display partition into each frame of corresponding rendered partition image.

In the case that a plurality of usage scenarios are triggered at the same time, when the partition identifier of the display partition is fused into the corresponding rendered partition image, the priority of the corresponding usage scenario can also be fused into the rendered partition image, so that when the drive circuit 40 performs the display driving subsequently, it may also perform the driving in accordance with the aforementioned priority level.

For display partitions corresponding to the same usage scenario, during processing, the partition images of the display partitions arranged in the front can be processed first according to the arrangement order of the display partitions.

In the case that a display partition corresponds to a plurality of usage scenarios, the priority corresponding to the display partition is the priority corresponding to the usage scenario with high priority. As shown in FIG. 4, it is assumed that the display partition for high-definition display corresponding to human eye gaze coordinate is display partition 28, the display partition for high-definition display corresponding to display content update includes display partitions 20 to 22, 28 to 30, 36 to 38, and 44 to 46. It is assumed that the priority corresponding to human eye gaze coordinate is 1, and the priority corresponding to display content update is 3 (the higher the number, the lower the priority), the priority corresponding to display partition 28 is 1, and the priority corresponding to display partitions 20-22, 29-30, 36-38 and 44-46 are all 3.

Since the display content generation circuit 20 renders only the partition image of the display partition for high-definition display determined by the multi-scenario trigger circuit 10, and does not have to render the entire frame image (the original image corresponding to the display area) displayed by the display device as is required in the prior art, the amount of data processing can be effectively reduced and the processing efficiency can be improved.

While the display content generation circuit 20 processes the partition image of the display partition for high-definition display, the display drive control circuit 30 also processes the control instruction corresponding to the display partition for high-definition display.

The display drive control circuit 30 is configured to generate a control instruction stream to drive the display partition for high-definition display, so that the display partition for high-definition display displays each frame image in the frame image data stream; each control instruction in the intelligent control instruction stream carries the same time identifier as the corresponding frame of rendered partition image of. The drive control logic of the display partition is realized by the control instruction stream.

Continuing with FIG. 3 as an example, the display drive control circuit 30 obtains the partition identifier of the display partition A for high-definition display from the multi-scenario trigger circuit 10 and determines the control instruction stream that needs to be generated to drive the display partition A for display.

In a possible embodiment, the display drive control circuit is further configured to generate corresponding drive state control instructions and timing control instructions according to the partition identifier of the display partition for high-definition display; the drive state control instructions are configured to perform function control on the drive circuit to control the display partition for high-definition display to perform high-definition display; the timing control instructions are configured to generate a timing control signal required for image display for the display partition for high-definition display.

For example, the drive control instructions can control the following functions in the drive circuit: matching the power supply of independent partitions, data arrangement, mapping restoration, OP switch/thrust (i.e., load drive capability), etc.; the timing control can match and generate synchronization control among multiple drive chips (such as a source drive chip and a gate drive chip), output control timing of the source drive chip, panel MUX switch control timing, gate scan control timing, etc.

The display content generation circuit 20 generates a frame image data stream corresponding to the display partition for high-definition display and then transmits the frame image data stream to the drive circuit 40; the display drive control circuit 30 generates a control instruction stream corresponding to the display partition for high-definition display and transmits the control instruction stream to the drive circuit 40.

The drive circuit 40 is configured, for the frame image data stream and the control instruction stream which have the same partition identifier, to form control instructions which have the same time identifier, and rendered partition images into a group, and in chronological order, drive, group by group and according to the control instruction in the current group, the corresponding display partition to display a rendered partition image in the current group.

For example, still taking FIG. 3 as an example, it is assumed that the frame image data stream received by the drive circuit 40 from the display content generation circuit 20 includes six frames of rendered partition images of the display partition A (denoted as partition image 1 to partition image 6), each of which carries a partition identifier "A" the display partition A, and the time identifier of the corresponding frame of partition image (the time identifiers of the partition image 1 to the partition image 6 are sequentially the time identifier 1 to the time identifier 6).

The control instruction stream received by the drive circuit 40 from the display drive control circuit 30 includes control instruction 1 to control instruction 6, each of which carries a partition identifier "A" of the display partition A and a time identifier corresponding to the control instruction (the time identifiers of the control instruction 1 to the control instruction 6 are sequentially time identifier 1 to time identifier 6).

According to the partition identifiers carried in the partition image 1 to the partition image 6 and the partition identifiers carried in the control instruction 1 to the control instruction 6, the drive circuit 40 can determine that they belong to a same display partition, and then according to the time identifier carried by each of them, group the partition images and the control instructions with the same time identifier into a group. For example, both the control instruction 1 and the partition image 1 have the same time identifier 1, so the control instruction 1 and the partition image 1 are grouped into one group, and other groups can be formed in the same way.

Then, in the chronological order corresponding to the time identifier, the display partition A is driven to display the rendered partition image in the current group, group by group and according to the control instruction in the current group. According to the time corresponding to the time identifier, it is determined that the partition image 1 should be displayed currently, and the group composed of the control instruction 1 and the partition image 1 is the current group, and the drive circuit 40 drives the display partition A to display the partition image 1 according to the control instruction 1; after the display is completed, the group composed of the control instruction 2 and the partition image 2 becomes the current group, and the drive circuit 40 drives the display partition A to display the partition image 2 according to the control instruction 2. In the same way, other partition images can be displayed, which will not be repeated here.

Figure 5:
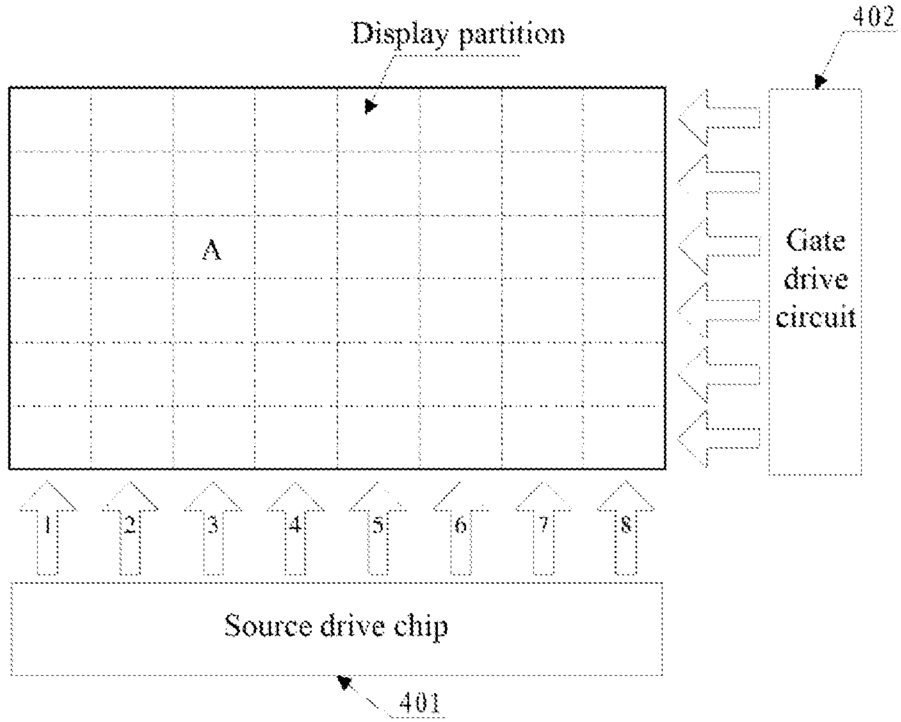
FIG. 5 is a schematic diagram I of a structure of a drive circuit according to an embodiment of the present disclosure.

Referring to FIG. 5, FIG. 5 is a schematic diagram I of a structure of a drive circuit according to an embodiment of the present disclosure, the drive circuit 40 includes:

A source drive chip 401, which is configured to gate the data channel corresponding to the display partition for high-definition display according to the control instruction in the current group, and convert the rendered partition image in the current group into the corresponding data drive signal, which is supplied to the display partition for high-definition display through the data channel to drive a corresponding column of pixels.

The source drive chip 401 may correspond to a plurality of data channels, each data channel includes a plurality of data lines connected to pixels in the display partition, and the source drive chip 401 provides a data drive signal to the display partition through the data channel corresponding to the display partition.

For example, taking FIG. 5 as an example, a column of display partitions corresponds to a data channel in FIG. 5, and the data channels in FIG. 5 are denoted as data channel 1 to data channel 8 (different channels are shown by display numbers in FIG. 5). It is assumed that a group consisting of a rendered partition image corresponding to the display partition A (denoted as a partition image A) and a corresponding control instruction (denoted as a control instruction A) is the current group, as shown in FIG. 5, the source drive chip 401 gates a data channel 3 corresponding to the display partition A according to the control instruction A in the current group, then converts the partition image A into a corresponding data drive signal, and supplies the data drive signal to the display partition A through the data channel 3, so as to drive the pixels in the display partition A to display the partition image A in high definition.

The gate drive circuit 402 is configured to provide a row scan signal to a plurality of pixel rows where the display partition for high-definition display is located according to a control instruction in the current group to refresh the data drive signal to the display partition for high-definition display.

Scan lines connected to pixels in the display partition are connected with the gate drive circuit 402.

Still taking FIG. 5 as an example, while the source drive chip 401 provides the data drive signal corresponding to the partition image A to the display partition through the data channel 3, the gate drive circuit 402 is also required to provide the corresponding scan signal to the pixel rows in the display partition A, so as to refresh the data drive signal to the display partition A for high-definition display.

Figure 6:
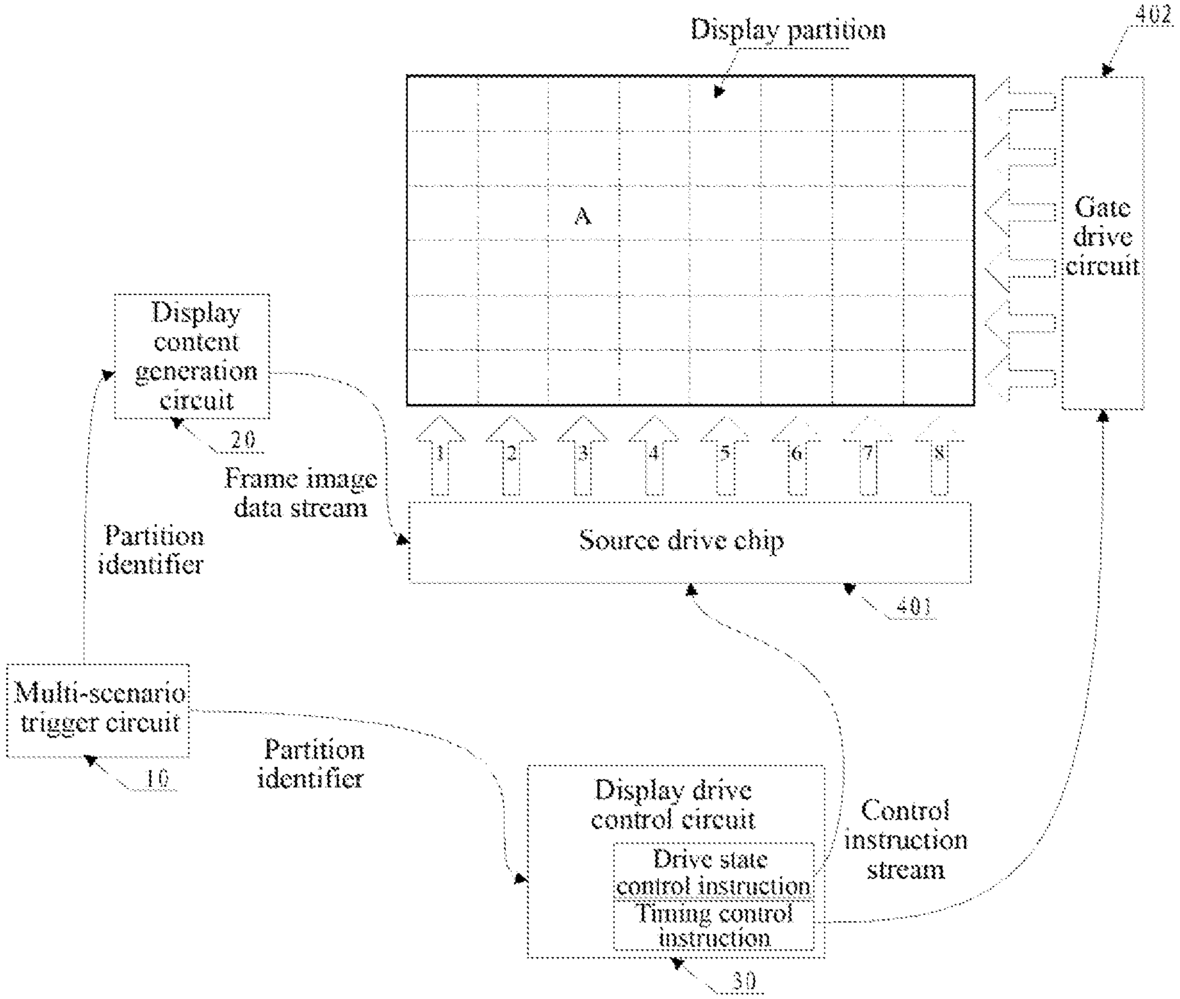
FIG. 6 is a schematic diagram II of a structure of a display system according to an embodiment of the present disclosure.
Figure 7:
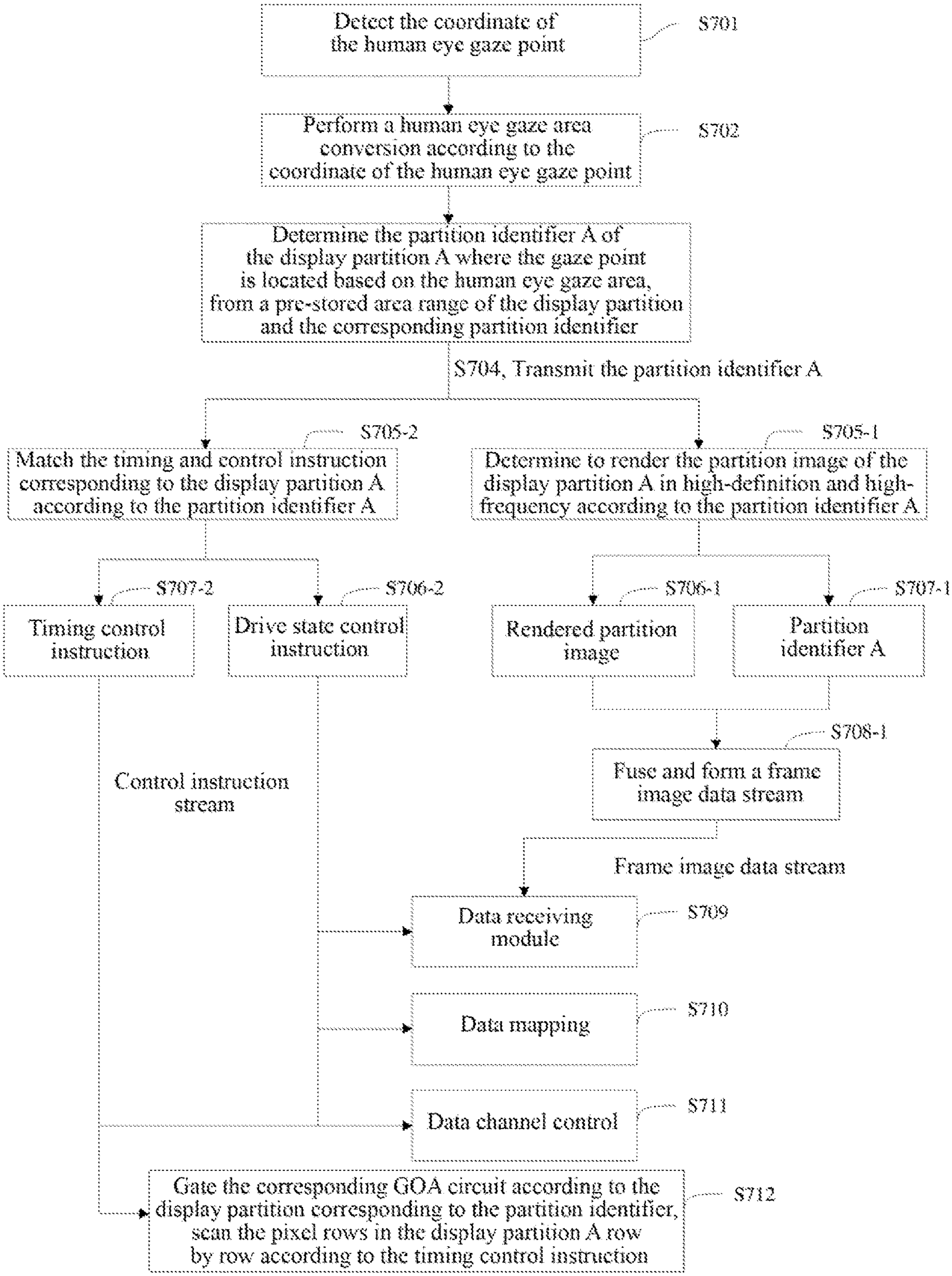
FIG. 7 is a workflow diagram of a display system according to an embodiment of the present disclosure.

Referring to FIG. 6 and FIG. 7, FIG. 6 is a schematic diagram II of a structure of a display system according to an embodiment of the present disclosure, and FIG. 7 is a workflow diagram of a display system according to an embodiment of the present disclosure. FIG. 7 is a workflow diagram for the structure of the display system in FIG. 6.

FIG. 6 is based on FIG. 5, and by taking a case in which the triggered usage scenario is human eye gaze coordinate as an example, the multi-scenario trigger circuit 10 detects the coordinate of the human eye gaze point in S701, performs a human eye gaze area conversion according to the coordinate of the human eye gaze point in S702, determines the partition identifier A of the display partition A where the gaze point is located based on the human eye gaze area, from a pre-stored area range of the display partition and the corresponding partition identifier in S703 (assuming that the display partition where the human eye gaze area is located in FIG. 6 is the display partition A), and transmits the partition identifier A of the display partition A to the display content generation circuit 20 and the display drive control circuit 30 in S704.

After receiving the partition identifier A of the display partition for high-definition display sent by the multi-scenario trigger circuit 10, the display content generation circuit 20 determines to render the partition image of the display partition A in high-definition and high-frequency according to the partition identifier A in S705-1, obtains the rendered partition image in S706-1, fuses, in S708-1, the rendered partition image with the partition identifier A of the display partition A in S707-1, and forms a frame image data stream, which is sent to the source drive chip 401 in the drive circuit 40.

At the same time, after receiving the partition identifier A of the display partition for high-definition display sent by the multi-scenario trigger circuit 10, the display drive control circuit 30 matches the timing and control instruction corresponding to the display partition A according to the partition identifier A in S705-2, generates a drive state control instruction (S706-2) and a timing control instruction (S707-2) corresponding to the display partition A, forms a control instruction stream, and transmits the control instruction stream to the source drive chip 401 and the gate drive circuit 402 in the drive circuit 40.

After receiving the frame image data stream sent by the display content generation circuit 20 and the control instruction stream sent by the display drive control circuit 30, the source drive chip 401 in the drive circuit 40 performs data channel gating control (i.e., gating the data channel corresponding to the display partition A) according to the control instruction by using a data receiving module in S709, and matches the partition identifiers in the frame image data stream and the control instruction stream; data mapping is performed in S710, that is, data corresponding to the partition image is mapped to the chip partition corresponding to the display partition A according to the partition identifier and the display mode, so as to merge data restoration; in S711, data channel control is performed, that is, according to the partition identifier A, the OP drive capability gear of the display partition A is adjusted, and the OP multiplexing relationship is controlled on and off.

After receiving the control instruction stream sent by the display control drive circuit 30, the gate drive circuit 402 in the drive circuit 40 gates the corresponding GOA circuit according to the display partition corresponding to the partition identifier in S712, and scans the pixel rows in the display partition A row by row according to the timing control instruction, displays the partition image corresponding to the display partition A in the display partition A in high definition/high frequency.

It is to be noted that the above instructions are illustrated by taking a case that the triggered usage scenario is human eye gaze coordinate as an example, and there are other usage scenarios in practical applications, which should not be understood as being limited to the scenario for the human eye gaze coordinate. The difference between different scenarios in the above processing only lies in the different ways of determining the triggered usage scenarios.

In a possible embodiment, the source drive chip 401 includes:

A plurality of data partitions, each of which corresponds to a data transmission channel for a column of display partitions.

Taking FIG. 5 as an example, the source drive chip 401 includes eight data partitions corresponding to the eight data channels shown in FIG. 5. The display partition for high-definition display is display partition A, and its corresponding data channel 3 is in an on state, while the data channels 1-2 and 4-8 corresponding to other display partitions for non-high-definition display (i.e., other display partitions in the figure except for the column where display partition A is located) are in an off state.

It should be understood that although the data channels corresponding to the display partitions for non-high-definition display are in an off state, it does not mean that they do not display images. In fact, the display partitions for non-high-definition display maintain the display of the originally displayed partition images.

Figure 8:
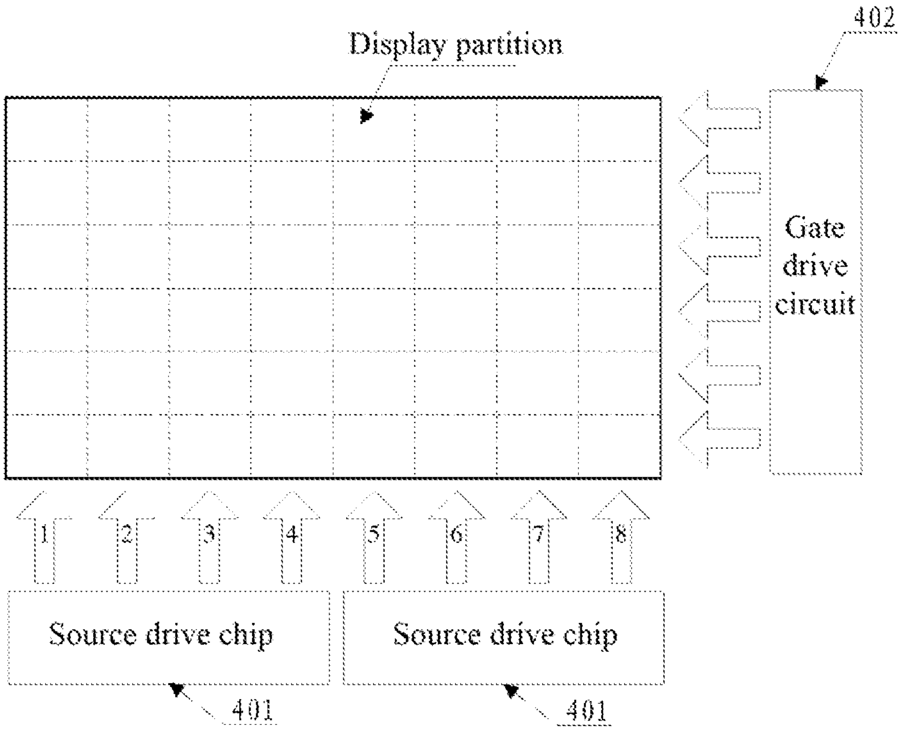
FIG. 8 is a schematic diagram II of a structure of a drive circuit according to an embodiment of the present disclosure.

Referring to FIG. 8, FIG. 8 is a schematic diagram II of a structure of a drive circuit according to an embodiment of the present disclosure. The drive circuit 40 may also include a plurality of source drive chips 401. FIG. 8 is illustrated by taking a case that the drive circuit 40 includes two source drive chips 401 as an example, each source drive chip 401 includes four data partitions, and each data partition corresponds to one data channel, so each source drive chip 401 corresponds to four data channels in FIG. 8.

In a possible embodiment, the source drive chip 401 is further configured to arrange a plurality of partition images corresponding to the display partition for high-definition display within an interval time between the entire frame images.

Figure 9:
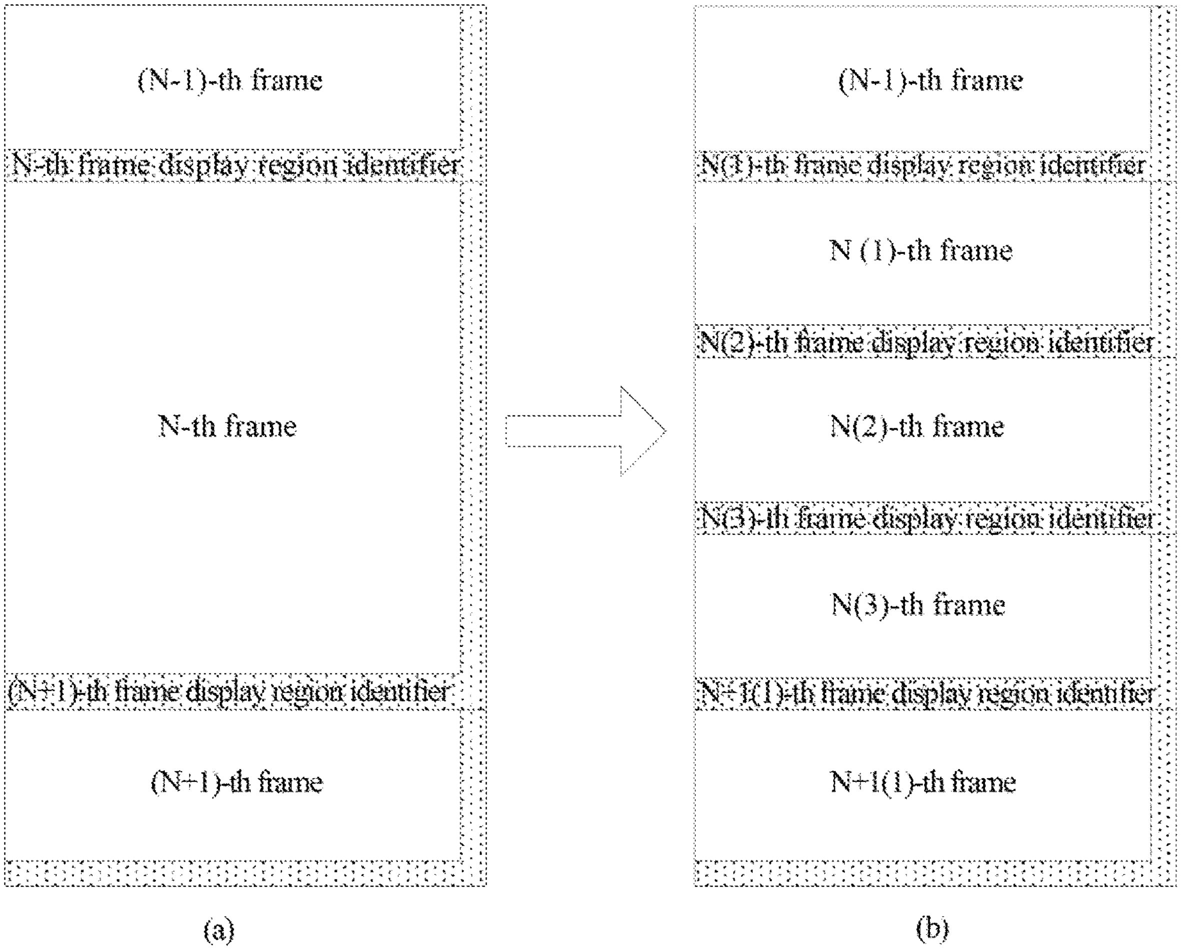
FIG. 9 is a schematic diagram of an arrangement of partition images in an interval area between entire frame images according to an embodiment of the present disclosure.

Referring to FIG. 9, FIG. 9 is a schematic diagram of an arrangement of partition images in an interval area between entire frame images according to an embodiment of the present disclosure.

(a) in FIG. 9 shows the data transmission of the entire frame image corresponding to the display area (taking the transmission of (N−1)-th frame to (N+1)-th frame as an example), and the next entire frame image is transmitted within the interval area (i.e., a V-blanking area) after the effective data technology of the previous frame. As shown in FIG. 9, the N-th frame display region identifier is transmitted within the interval area after the (N−1)-th frame image is effectively displayed, and then the N-th frame image is transmitted. The (N+1)-th frame display region identifier is transmitted in the interval area after the N-th frame image is effectively displayed, and then the (N+1)-th frame image is transmitted.

A plurality of partition images corresponding to a display partition for high-definition display are arranged in an interval area between entire frame images in the present disclosure, and the arrangement is as shown in (b) in FIG. 9. Assuming that at most three partition images can be arranged in one interval area, as shown in (b) in FIG. 9, three frames of partition images, i.e., N(1)-th frame to N(3)-th frame as shown in (b) in FIG. 9, can be arranged in the interval area of the N-th frame shown in FIG. 9 (*a*), and accordingly, corresponding frame display region identifiers (N(1)-th frame display region identifier to N(3)-th frame display region identifiers) are fused in each frame of partition image. In (b) in FIG. 9, only one frame of partition image (N+1(1)-th frame) and corresponding frame display region identifier (N+1(1)-th frame display region identifier) in the interval area of the (N+1)-th frame are shown, and other frames of partition images are not shown.

When there are a plurality of display partitions requiring high-definition display at the same time, partition images of different display partitions can be arranged in an interval area between entire frame images.

By arranging a plurality of partition images of the display partition for high-definition display in an interval area between entire frame images, the refresh rate of the display partition for high-definition display can be improved.

In a possible embodiment, in the gate drive circuit 402, multiple display partitions corresponding to the same row share a same frame start signal.

By allowing a plurality of display partitions in the same row share the same frame start signal, a plurality of display partitions can share a control line for the frame start signal, so that it is not necessary to set a separate control line for the frame start signal for each display partition, thereby preventing the problem that the control line for the frame start signal is exponentially increased and reducing the difficulty of wiring.

It should be understood that the frame start signal here refers to the start signal for scanning the scan lines in a display partition, rather than the frame start signal for the scan lines of the entire display area in the prior art.

In a possible embodiment, the drive circuit 40 further includes at least one TCON chip (i.e., a logic control chip) configured to convert the data corresponding to the received partition image into a signal that can be recognized by the source drive chip 401 and the gate drive circuit 402.

A plurality of TCON chips may be included in the drive circuit 40. When a partition image is a three-dimensional stereogram, each display partition for high-definition display corresponds to one TCON chip and one data channel. This can improve the update speed of three-dimensional stereograms.

In a possible embodiment, the drive circuit is further configured to: drive a display partition for high-definition display with idle resources; herein, the idle resources are the drive resources corresponding to display partitions for non-high-definition display.

Figure 10:
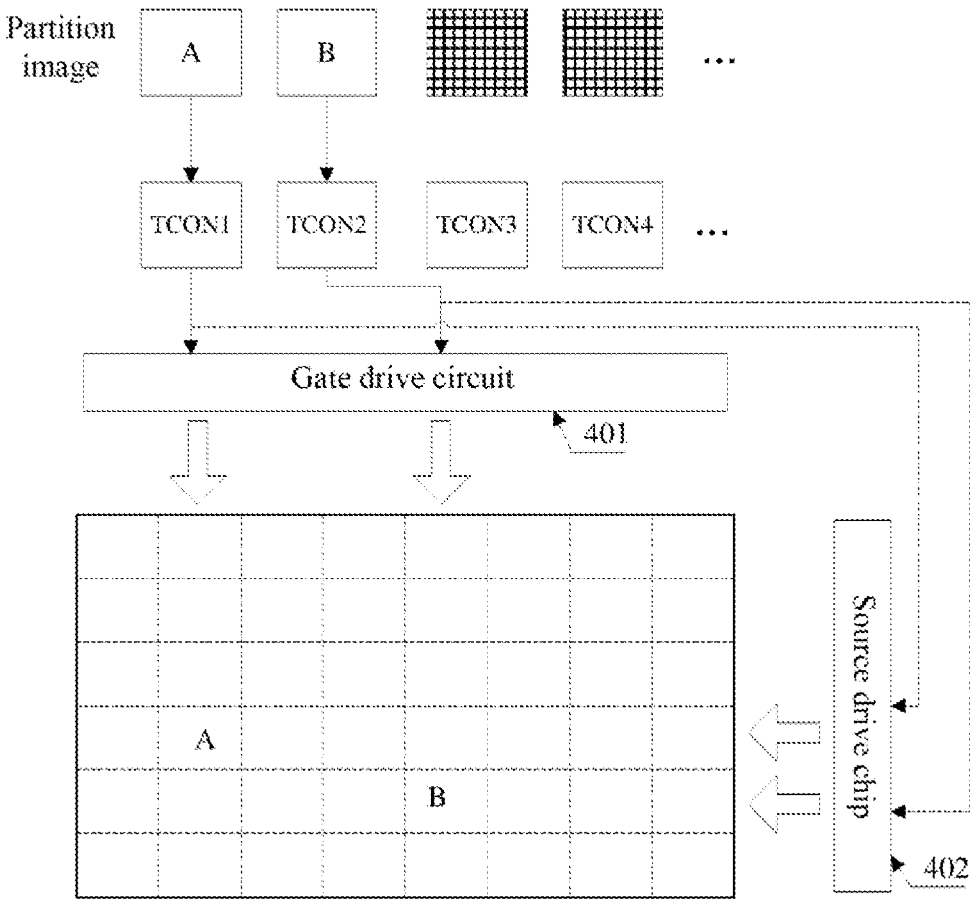
FIG. 10 is a schematic diagram I of the use of a TCON chip in a drive circuit according to an embodiment of the present disclosure.
Figure 11:
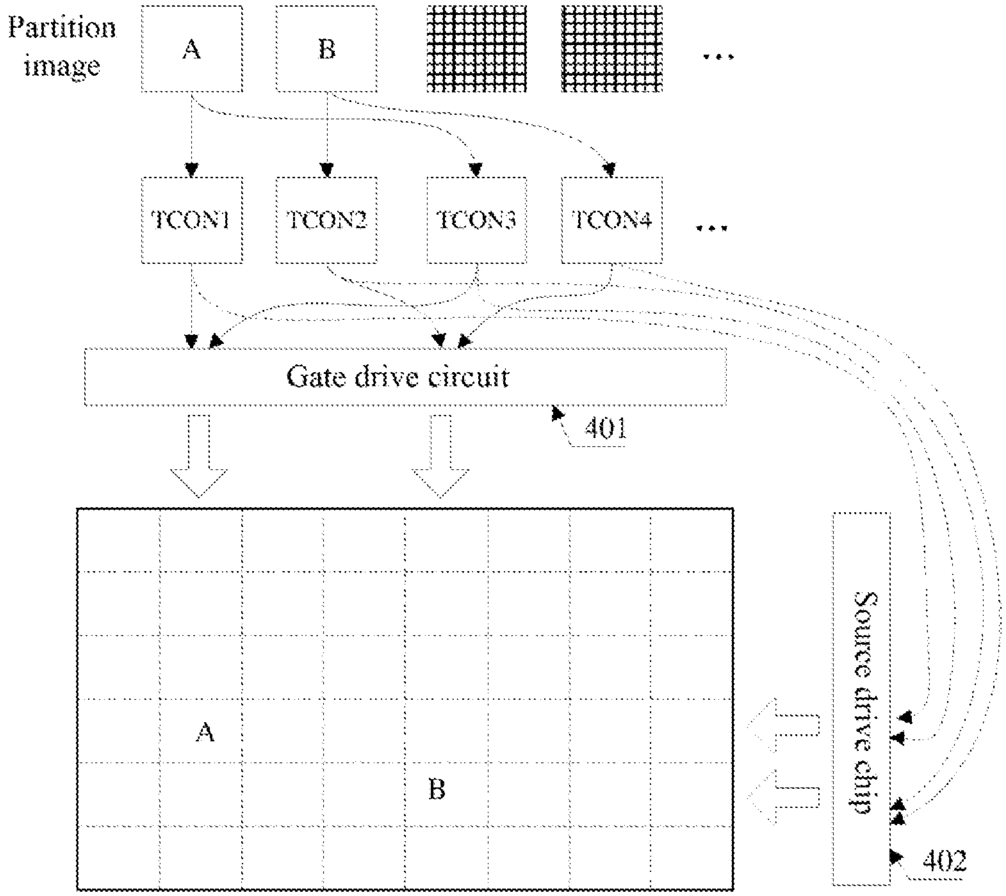
FIG. 11 is a schematic diagram II of the use of a TCON chip in a drive circuit according to an embodiment of the present disclosure.

Referring to FIG. 10 and FIG. 11, FIG. 10 is a schematic diagram I of the use of a TCON chip in a drive circuit according to an embodiment of the present disclosure, and FIG. 11 is a schematic diagram II of the use of a TCON chip in a drive circuit according to an embodiment of the present disclosure.

The multi-scenario trigger circuit determines that the display partition A and the display partition B of 48 display partitions in the display device are display partitions for high-definition display. Assuming that each column of display partition shares a TCON chip, the TCON chip resource corresponding to a column in which the display partition A is located is TCON1, the TCON chip resource corresponding to a column is located the display partition B is located is TCON2, and the TCON chips corresponding to the display partitions of other columns are idle TCON chip resources (such as TCON3 and TCON4).

After the drive circuit receives the frame image data stream of the two above display partitions, if the display partition A and the display partition B are not driven with idle resources, the corresponding drive schematic diagram is shown in FIG. 10, in which idle TCON3, TCON4, etc., are all in an off state (shown in FIG. 10 with their data transmission lines not shown), while TCON1 and TCON2 are both in an on state (shown in FIG. 10 with their data transmission lines shown).

If idle resources are used to drive the display partition A and the display partition B, as shown in FIG. 11, idle TCON3 and TCON4 are used to drive the display partition A and the display partition B respectively, TCON1 to TCON4 are in on state, the frame image data stream corresponding to the display partition A is split into odd and even parts, and TCON1 and TCON3 are respectively controlled to process the partition images of the odd and even parts. If the frame image data stream of the display partition A includes partition images A1 to A2*n*, then A1, A3, A5 . . . A (2n−1) are given to TCON1 for processing as partition images of the odd part, and the remaining partition images are given to TCON3 for processing as partition images of the even part, and the output path of TCON3 is switched to the data channel corresponding to the display partition A, so that the display partition A displays its corresponding partition image in high frequency, where n is a natural number. Similarly, TCON2 and TCON4 corresponding to the display partition B process the partition images in a manner similar to that described above and will not be repeated.

It should be noted that the above selection and utilization of idle resources and the switching of output paths are controlled by control instructions generated by the display drive control circuit.

Figure 12:
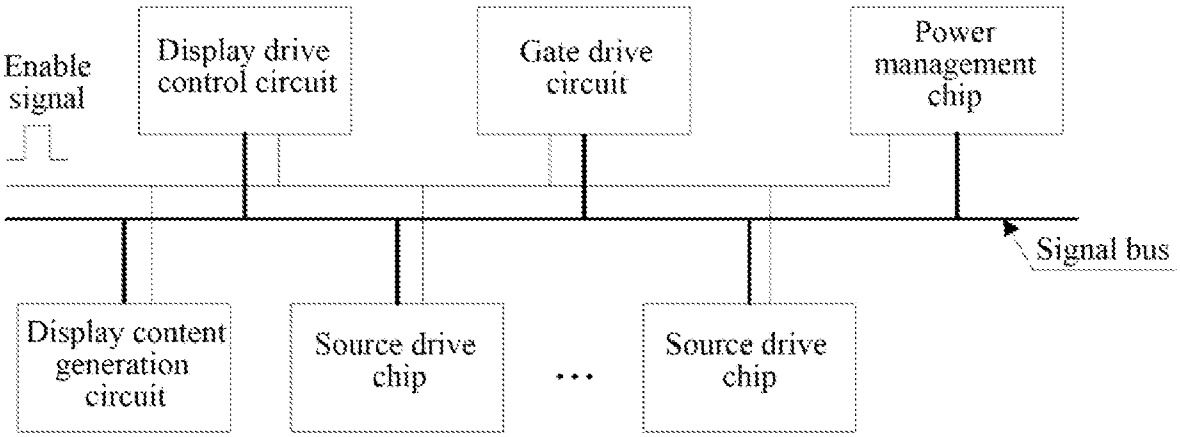
FIG. 12 is a schematic diagram of a data transmission architecture in a display device according to an embodiment of the present disclosure.

Referring to FIG. 12, FIG. 12 is a schematic diagram of a data transmission architecture in a display device according to an embodiment of the present disclosure.

All chips in the display device are connected in parallel with the same signal bus, which is used for transmitting data or instructions; different chips time-multiplex the signal bus.

The chips connected with the signal bus cache the received control instructions simultaneously upon receipt of a same enable signal.

As shown in FIG. 12, the display drive control circuit 30 can transmit the control instruction stream generated by the display drive control circuit 30 and the frame image data stream generated by the display content generation circuit 20 to the source drive chip 401, the gate drive circuit 402, and the power management chip in the drive circuit 40 through the signal bus.

The above data bus can be connected with each component of the display device in the traditional differential approach, the single-ended CLK+Data approach and the like. Each component of the display device includes, but is not limited to, a display content generation circuit 20, a display drive control circuit 30, a source drive chip 401, a gate drive circuit 402, a power management chip, and the like, all of which are connected to the same signal bus and can simultaneously receive control instructions. Since the distances between different components and the display drive control circuit 30 are different, the time for different components to receive control instructions through the data bus is different. Therefore, a separate signal line is also provided in the data transmission architecture of the display device for transmitting an enable signal, which is a pulse signal. When each component receives the enable signal, the received control instructions are cached at the same time, so that mismatch of control instructions can be prevented.

Since each component in the display device transmits data through the same signal bus, the data packets transmitted in the signal bus adopt the following data format, in order to enable each component to accurately receive corresponding data. The data format includes:

An instruction feature portion configured to indicate a type of instruction;

An identifier recognition portion configured as a chip and a chip partition corresponding to the data packet;

A register portion configured to store control instructions or data.

Figure 13:
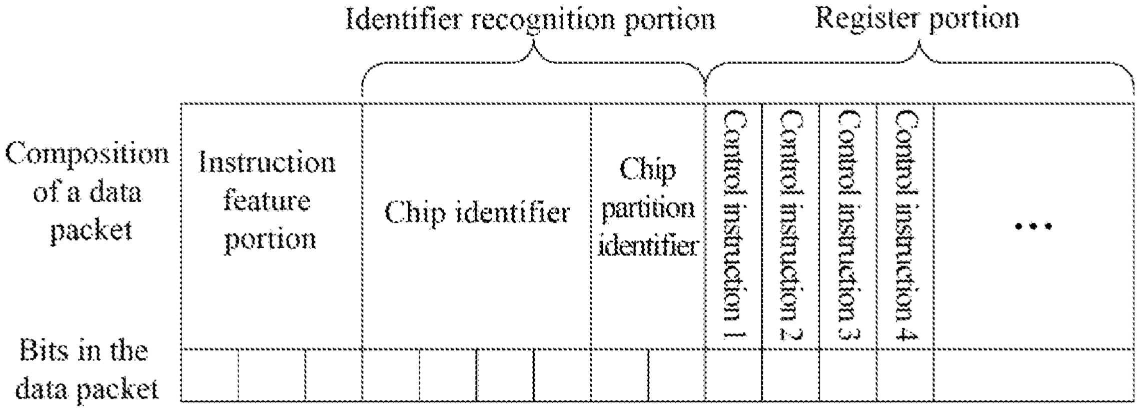
FIG. 13 is a schematic diagram of a structure of a data packet transmitted in a signal bus according to an embodiment of the present disclosure.

Referring to FIG. 13, FIG. 13 is a schematic diagram of a structure of a data packet transmitted in a signal bus according to an embodiment of the present disclosure. FIG. 13 shows that the composition of a data packet includes an instruction portion, an identifier recognition portion and a register portion and their corresponding bits in the data packet.

The instruction portion comprises 1 bit high level+Nbit feature bits+1 bit high level, wherein the Nbit feature bits is used to identify the types of different instructions. If N is 2, then the specification portion is composed of 4 bits of data, and the middle 2 bits are used to identify the type of instruction. If the timing control instruction of the source drive chip is identified with 01, then the data of the specification portion is 1011.

The identifier recognition portion includes a chip identifier and a chip partition identifier. For example, if the display partition for high-definition display corresponds to the partition 1 in the source drive chip A, the chip identifier for the source drive chip A is 0010, and the identifier for the partition 1 is 01, the data of the identifier recognition portion in the data packet is 001001.

The register portion can store control instructions as well as data, such as partition images. FIG. 11 shows a case where control instructions 1 to 4 are stored in the register portion.

In order to enable those skilled in the art to more fully understand the above scheme, description is given by taking a case that the current triggered usage scenario is human eye gaze coordinate as an example.

The multi-scenario trigger circuit 10 determines that the current triggered scenario is a human eye gaze coordinate by means of an external trigger condition (a gaze point coordinate detected by the human eye), and the gaze point coordinate is located in a display partition A among a plurality of display partitions of the display device. The multi-scenario trigger circuit 10 determines a display partition for high-definition display among the plurality of display partitions as the display partition A, and transmits a partition identifier of the display partition A to the display content generation circuit 20 and the display drive control circuit 30.

In embodiments of the present disclosure, partition image processing and partition drive control are independently processed, and within the entire display system, the multi-scenario trigger circuit is used to determine the current triggered usage scenario, and then the display partition needing high-definition display is determined, and thereafter, the partition image of the display partition is rendered by the display content generation circuit, and is fused with the corresponding partition identifier to form a frame image data stream. At the same time, the drive control circuit is also used to generate a control instruction driven by logic of differentiated display corresponding to the display partition for high-definition display to form a control instruction stream, and the above frame image data stream and the control instruction stream are transmitted to the drive circuit 40 to realize global differential drive control from front to back, that is, based on the trigger conditions of the scenario, the local content rendering and display drive (including dynamic data bandwidth and data path adjustment, power supply gear matching, drive chip internal data mapping format switching, analog drive module gear and switch control, etc.) is realized.

Compared with conventional display driving method of rendering the entire frame image and displaying line by line, the display system adopted in the present disclosure can dynamically render, transmit and display the smallest unit of the display area (i.e., the display partition) based on the application scenario, which greatly improves the flexibility of display control and the utilization of hardware display feature resources.

Based on the same inventive concept, an embodiment of the present disclosure provides a display device comprising a display system as described above.

The display device may be, for example, a television set, an advertisement screen, etc.

It should be understood by those skilled in the art that embodiments of the present disclosure may be provided as methods, systems, or computer program products. Therefore, embodiments of the present disclosure may adopt the form of an entire hardware embodiment, an entire software embodiment, or an embodiment combining software and hardware aspects. Furthermore, embodiments of the present disclosure may take the form of a computer program product implemented on one or more computer usable memory media (including but not limited to a magnetic disk memory, CD-ROM and an optical memory, etc.) containing computer usable program codes therein.

Embodiments of the present disclosure is described with reference to flowcharts and/or block diagrams of methods, devices (systems) and computer program products according to embodiments of the present disclosure. It should be understood that each workflow and/or block in the flowchart and/or block diagram, as well as combinations of the workflow and/or block in the flowchart and/or block diagram, may be implemented by computer program instructions. These computer program instructions may be provided to a general purpose computer, a special purpose computer, an embedded processor, or a processor of other programmable data processing device to generate a machine such that instructions executed by the computer or the processor of other programmable data processing device generate means for performing the functions specified in one or more workflows of a flowchart and/or one or more blocks of a block diagram.

These computer program instructions may also be stored in a computer-readable memory capable of directing a computer or other programmable data processing device to operate in a specific manner such that the instructions stored in the computer-readable memory produce an article of manufacture comprising instruction means for performing the functions specified in one or more workflows of a flowchart and/or one or more blocks of a block diagram.

These computer program instructions may also be loaded onto a computer or other programmable data processing device such that a series of operational steps are executed on the computer or other programmable device to produce computer-implemented processing, such that the instructions executed on the computer or other programmable device provide steps for performing the functions specified in one or more workflows of a flowchart and/or one or more blocks of a block diagram.

Apparently, various modifications and variations to the present disclosure may be made by those skilled in the art without departing from the spirit and scope of the present disclosure.

Thus, if these modifications and variations to the present disclosure fall within the scope of the claims of the present disclosure and their equivalent techniques, the present disclosure is intended to include these modifications and variations.

The invention claimed is:

1. A display system applied to a display device comprising a plurality of display partitions, comprising:

a multi-scenario trigger circuit, configured to determine, according to a usage scenario in which the display device is triggered, a display partition for high-definition display among the plurality of display partitions;

a display content generation circuit, configured to render each frame of a partition image of the display partition for high-definition display, and fuse a partition identifier of the display partition for high-definition display into each frame of the rendered partition image to form a corresponding frame image data stream;

a display drive control circuit, configured to generate a control instruction stream to drive the display partition for high-definition display so that the display partition for high-definition display displays each frame of an image in the frame image data stream; wherein, each control instruction in the control instruction stream carries a same time identifier as the corresponding rendered partition image;

a drive circuit, configured, for the frame image data stream and the control instruction stream which have a same partition identifier, to form control instructions which have a same time identifier, and rendered partition images into a group, and in chronological order, drive, group by group and according to a control instruction in a current group, the corresponding display partition to display the rendered partition image in the current group;

wherein all chips in the display device are connected in parallel with a same signal bus which is used to transmit data or instructions;

different chips time-multiplex the signal bus;

a separate signal line is provided in the display system applied to the display device for transmitting an enable signal, which is a pulse signal; the chips connected with the signal bus are configured to cache received control instructions simultaneously upon receipt of the enable signal.

2. The display system of claim 1, wherein the multi-scenario trigger circuit is further configured to:

when the display device is simultaneously triggered with a plurality of usage scenarios, determine, according to the plurality of usage scenarios, a display partition corresponding to each usage scenario.

3. The display system of claim 2, wherein the display content generation circuit is further configured to:

when the display device is simultaneously triggered with a plurality of usage scenarios, render each frame of partition image of the display partition for high-definition display corresponding to the usage scenarios with high priority sequentially according to a priority level of the plurality of usage scenarios, and fuse a corresponding partition identifier into each corresponding frame of the rendered partition image to form a frame image data stream corresponding to each display partition for high-definition display.

4. The display system of claim 1, wherein the display drive control circuit is further configured to:

generate corresponding drive state control instructions and timing control instructions according to the partition identifier of the display partition for high-definition display; the drive state control instruction is configured to perform function control on the drive circuit to control the display partition for high-definition display to perform high-definition display; the timing control instructions are configured to generate timing control signals required for image display for the display partition for high-definition display.

5. The display system of claim 4, wherein the drive circuit further comprises at least one TCON chip.

6. The display system of claim 5, wherein, when the partition image is a three-dimensional stereogram, the drive circuit comprises a plurality of the TCON chips, and each display partition for high-definition display corresponds to one TCON chip and one data channel.

7. The display system of claim 1, wherein the drive circuit comprises:

a source drive chip, which is configured to gate, according to a control instruction in the current group, a data channel corresponding to the display partition for high-definition display, and convert the rendered partition image in the current group into a corresponding data drive signal, which is provided to the display partition for high-definition display through the data channel to drive a corresponding column of pixels;

a gate drive circuit, which is configured to provide, according to a control instruction in the current group, a row scan signal to a plurality of pixel rows where the display partition for high-definition display is located, so as to refresh the data drive signal to the display partition for high-definition display.

8. The display system of claim 7, wherein the source drive chip comprises:

a plurality of data partitions, each of which corresponds to a data transmission channel for a column of display partitions.

9. The display system of claim 7, wherein the source drive chip is further configured to arrange a plurality of partition images corresponding to the display partition for high-definition display in an interval area between entire frame images.

10. The display system of claim 7, wherein in the gate drive circuit, a plurality of display partitions corresponding to a same row share a same frame start signal.

11. The display system according to claim 7, wherein, in the display device, the data channels of display partitions other than the display partition for high-definition display are in an off state.

12. The display system of claim 7, wherein the drive circuit is further configured to:

drive the display partition for high-definition display with idle resources; wherein, the idle resources are drive resources corresponding to display partitions other than the display partition for high-definition display.

13. The display system of claim 1, wherein a data format for data packets transmitted in the signal bus comprises:

a feature specification portion configured to indicate a type of instruction;

an identifier recognition portion configured as a chip and a chip partition corresponding to the data packet;

a register portion configured to store control instructions or data.

14. A display device comprising the display system according to claim 1.

* * * * *